United States Patent
Weintraub et al.

(10) Patent No.: US 12,547,606 B2
(45) Date of Patent: Feb. 10, 2026

(54) INTEGRITY VERIFICATION IN CLOUD DATA LAKES

(71) Applicant: International Business Machines Corporation, Armonk, NY (US)

(72) Inventors: Grisha Weintraub, Givatayim (IL); Leonid Rise, Beer Sheva (IL); Eli Shemesh, Ramat-Gan (IL); Avraham Illouz, Lod (IL)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 18/670,776

(22) Filed: May 22, 2024

(65) Prior Publication Data

US 2025/0363089 A1 Nov. 27, 2025

(51) Int. Cl.
*G06F 16/23* (2019.01)
(52) U.S. Cl.
CPC .............. *G06F 16/2365* (2019.01)
(58) Field of Classification Search
None
See application file for complete search history.

(56) References Cited

U.S. PATENT DOCUMENTS

| | | | |
|---|---|---|---|
| 7,870,398 B2 | 1/2011 | Perng et al. | |
| 8,055,635 B2 * | 11/2011 | Hsu | G06F 16/2455 707/700 |
| 11,531,666 B1 * | 12/2022 | Park | G06F 16/2272 |
| 11,645,424 B2 | 5/2023 | Weintraub et al. | |
| 2018/0341254 A1 * | 11/2018 | Ovens | G06F 18/254 |
| 2021/0110048 A1 * | 4/2021 | Guo | H04L 9/0643 |
| 2021/0328803 A1 * | 10/2021 | Kanza | H04L 9/3247 |
| 2021/0334409 A1 * | 10/2021 | Weintraub | G06F 21/64 |

(Continued)

FOREIGN PATENT DOCUMENTS

| | | |
|---|---|---|
| CN | 110365469 A | 10/2019 |
| CN | 117349271 A | 1/2024 |

OTHER PUBLICATIONS

Anonymous, "Amazon S3", URL: https://aws.amazon.com/s3/, Retrieved: May 14, 2024, 8 pages.

(Continued)

*Primary Examiner* — Khanh B Pham
*Assistant Examiner* — Navneet Gmahl
(74) *Attorney, Agent, or Firm* — CANTOR COLBURN LLP; Teddi Maranzano (57) ABSTRACT

Methods for performing integrity verification of data obtained from cloud data lake are provided. Aspects include transmitting a request for a data set to the cloud data lake, receiving a plurality of file names from the cloud data lake, and extracting, from the plurality of file names, one or more partitions of the cloud data lake that stores the plurality of files. Aspects also include calculating a partition hash value for each of the one or more partitions, obtaining a metadata table created by a data owner of the plurality of files, and obtaining verified partition hash values from the metadata table. Based on a determination that one or more of the verified partition hash values are not equal to corresponding calculated partition hash values, aspects include creating an alert that the plurality of files received from the data lake is not a complete response to the request.

18 Claims, 6 Drawing Sheets

(56) References Cited

U.S. PATENT DOCUMENTS

| | | | | |
|---|---|---|---|---|
| 2021/0350027 | A1* | 11/2021 | Sakurada | G06F 21/74 |
| 2021/0397600 | A1* | 12/2021 | Desai | H04L 9/0643 |
| 2023/0205757 | A1* | 6/2023 | Gupta | G06F 16/254 |
| | | | | 707/703 |
| 2023/0315579 | A1* | 10/2023 | Arumugam | G06F 11/1458 |
| | | | | 713/189 |

OTHER PUBLICATIONS

Anonymous, "Azure Blob Storage", URL: https://azure.microsoft.com/en-us/products/storage/blobs, Retrieved: May 14, 2024, 6 pages.

Anonymous, "Service Quotas", URL: https://docs.aws.amazon.com/athena/latest/ug/service-limits.html, Retrieved: May 15, 2024, 5 pages.

Arasu et al., "Concerto: A High Concurrency Key-Value Store with Integrity", Proceedings of the 2017 ACM International Conference on Management of Data, 2017, 16 pages.

Brandenberger et al., "Don't Trust the Cloud, Verify: Integrity and Consistency for Cloud Object Stores", ACM, SYSTOR'15, May 26-28, 2015, 11 pages.

Hong et al., "Query Integrity Verification based-on MAC Chain in Cloud Storage", IEEE, ICIS, Jun. 4-6, 2014, 5 pages.

Jain et al., "Analyzing and Comparing Lakehouse Storage Systems", 13th Annual Conference on Innovative Data Systems Research, Jan. 8-11, 2023, pp. 1-6.

Jang et al., "A New Query Integrity Verification Method with Cluster-based Data Transformation in Cloud Computing Environment", International Journal of Smart Home, vol. 9, No. 4, 2015, pp. 225-238.

Kallahalla et al., "Plutus: Scalable secure file sharing on untrusted storage", 2nd USENIX Conference on File and Storage Technologies, Mar. 31-Apr. 2, 2003, pp. 29-42.

Maheshwari et al., "How to Build a Trusted Database System on Untrusted Storage", 4th USENIX OSDI Symposium, 2000, 16 pages.

Merkle, "A Digital Signature Based On a Conventional Encryption Function", CRYPTO, 1988, pp. 369-378.

Morovat et al., "Verifying Integrity of Big Data in Cloud Databases", ResearchGate, DOI: 10.1109/CSCI.2017.270, Dec. 2017, pp. 1-6.

Narasimha et al., "DSAC: integrity for outsourced databases with signature aggregation and chaining", Proceedings of the 14th ACM International Conference on Information and Knowledge Management, Oct. 2005, pp. 235-236.

Pletka et al., "Cryptographic Security for a High-Performance Distributed File System", 24th IEEE Conference on Mass Storage Systems and Technologies, Sep. 24-27, 2007, 6 pages.

Rivest et al., "A method for obtaining digital signatures and public-key cryptosystems", Communications of the ACM, vol. 21, No. 2, Feb. 1978, pp. 120-126.

Wang et al., "Dual Encryption for Query Integrity Assurance", Proceedings of the 17th ACM Conference on Information and Knowledge Management, Oct. 2008, pp. 1-10.

Wei et al., "iBigTable: Practical Data Integrity for BigTable in Public Cloud", ACM, CODASPY'13, Feb. 18-20, 2013, pp. 341-352.

Weintraub et al., "Crowdsourced Data Integrity Verification for Key-Value Store in the Cloud", 17th IEE/ACM International Symposium on Cluster, Cloud and Grid Computing, 2017, 6 pages.

Weintraub et al., "Data Integrity Verification in col. Oriented NoSQL Databases", Data and Applications Security and Privacy XXXII: 32nd Annual IFIP WG 11.3 Conference, Jul. 16-18, 2018, pp. 1-16.

Weintraub et al., "Needle in a haystack queries in cloud data lakes", EDBT/ICDT Workshops, vol. 93, Mar. 23-26, 2021, 8 pages.

* cited by examiner

INTEGRITY VERIFICATION IN CLOUD DATA LAKES

BACKGROUND

The present disclosure generally relates to cloud-based data lakes, and more specifically, to performing integrity verification of data obtained from the cloud data lake.

A cloud data lake is a cloud-hosted centralized repository that provides nearly unlimited capacity and scalability for storing large-scale structured and unstructured data. However, since cloud users do not physically possess their data, cloud providers (or malicious entities that penetrated the cloud) can modify the data or return incorrect results to the users' queries. Ensuring data integrity is crucial in cloud data lakes as they are widely used as primary sources for analytics and machine learning models, making them critical for data-driven decision-making. However, maintaining data integrity poses several challenges, including ensuring the correctness, completeness, and freshness of the data.

Data correctness can be achieved using a digital signature scheme (e.g., RSA). For example, a data owner may sign each object uploaded to the cloud and store the signature as a separate object and a public key of the data owner can be used to verify the correctness of each object by verifying the corresponding signature. In general, data freshness is not an issue in a cloud data lake architecture as if the data lake is operated in an append-only mode (i.e., the data owner does not change existing objects, only uploads new ones with the new keys or deletes existing ones). However, existing methods for ensuring data completeness for data obtained from a data lake suffer from one or more shortcomings.

SUMMARY

Embodiments of the present disclosure are directed to computer-implemented methods for performing integrity verification of data obtained from a cloud data lake. According to an aspect, a computer-implemented method includes transmitting a request for a data set to a cloud data lake, receiving, in response to the request, a plurality of file names from the cloud data lake, and extracting, from the plurality of file names, one or more partitions of the cloud data lake that stores a plurality of files that satisfy the request. The method also includes calculating a partition hash value for each of the one or more partitions, obtaining a metadata table created by a data owner of the plurality of files, and obtaining verified partition hash values from the metadata table, each corresponding to one of the one or more partitions. Based on a determination that one or more of the verified partition hash values are not equal to corresponding calculated partition hash values, the method includes creating an alert that the plurality of files received from the cloud data lake is not a complete response to the request.

Embodiments also include computing systems and computer program products for performing integrity verification of data obtained from cloud data lakes.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

As described above, ensuring data integrity is crucial in cloud data lakes as they are widely used as primary sources for analytics and machine learning models, making them critical for data-driven decision making. However, maintaining data integrity poses several challenges, including ensuring the correctness, completeness, and freshness of the data. While sufficient methods for ensuring data correctness and freshness have been developed, existing methods for ensuring the completeness of data obtained from a data lake suffer from one or more shortcomings.

In exemplary embodiments, systems, methods, and computer program products for performing integrity verification of data obtained from cloud data lake are provided. In exemplary embodiments, a data owner maintains a metadata table that is used by clients that obtain files uploaded to the cloud data lake by the data owner to verify the completeness of the obtained data files. In exemplary embodiments, the files in the cloud data lake are stored in a partition structure that is determined by the data owner. The metadata table includes a partition hash value for each partition in the partition structure. The partition hash value is determined based on the files uploaded to the cloud data lake by the data owner. Once a client obtains the files that correspond to a particular partition, the client can calculate a hash value for that partition and compare it to the corresponding partition hash value from the metadata table. If the calculated hash value and the partition hash value from the metadata table are the same, the data obtained for that partition is complete. However, if the calculated hash value and the partition hash value from the metadata table are not the same, the data obtained for that partition is not complete.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
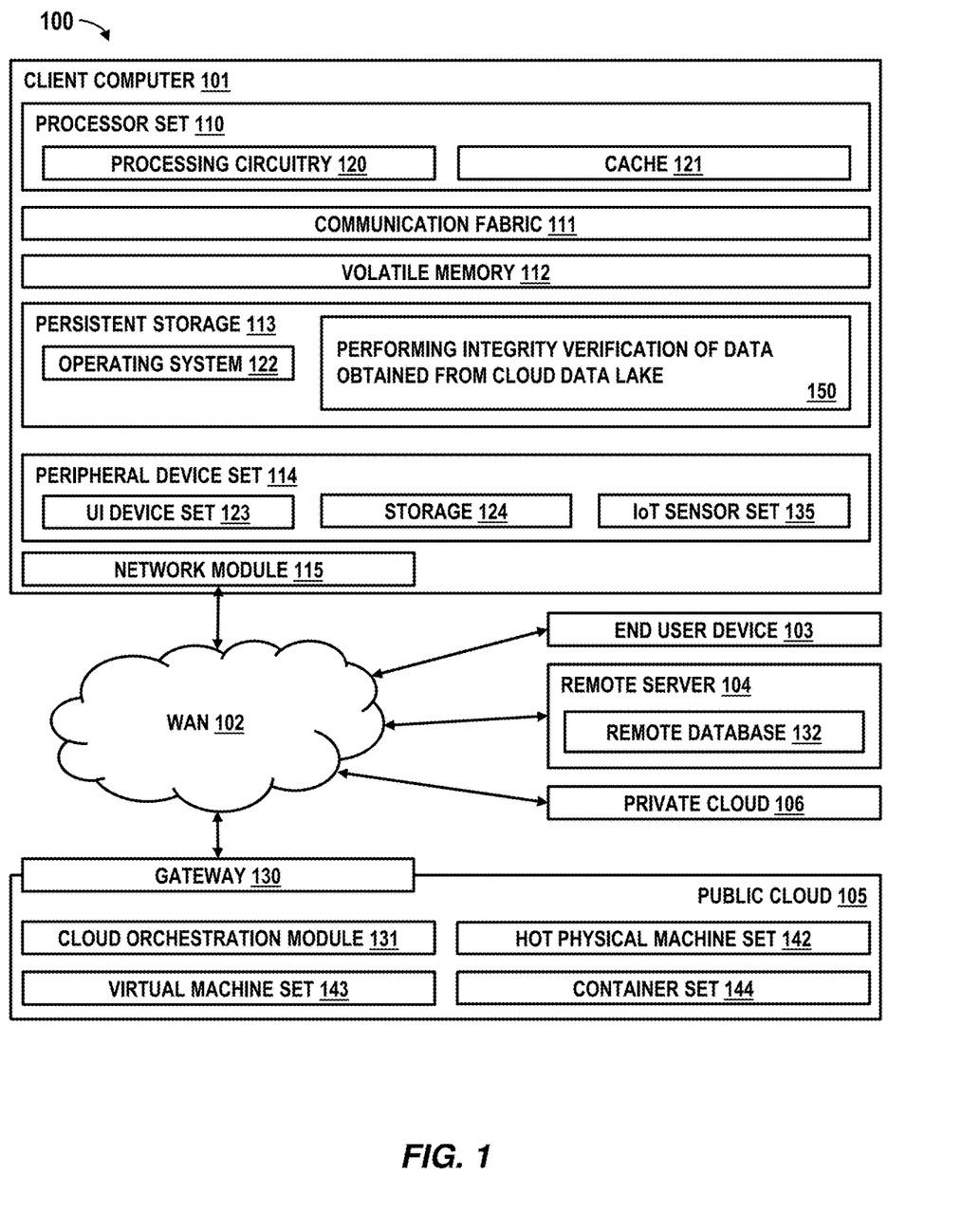
FIG. 1 depicts a block diagram of an example computer system for use in conjunction with one or more embodiments of the present disclosure.

Computing environment 100 contains an example of an environment for the execution of at least some of the computer code involved in performing the inventive methods, such as performing integrity verification of data obtained from cloud data lake as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
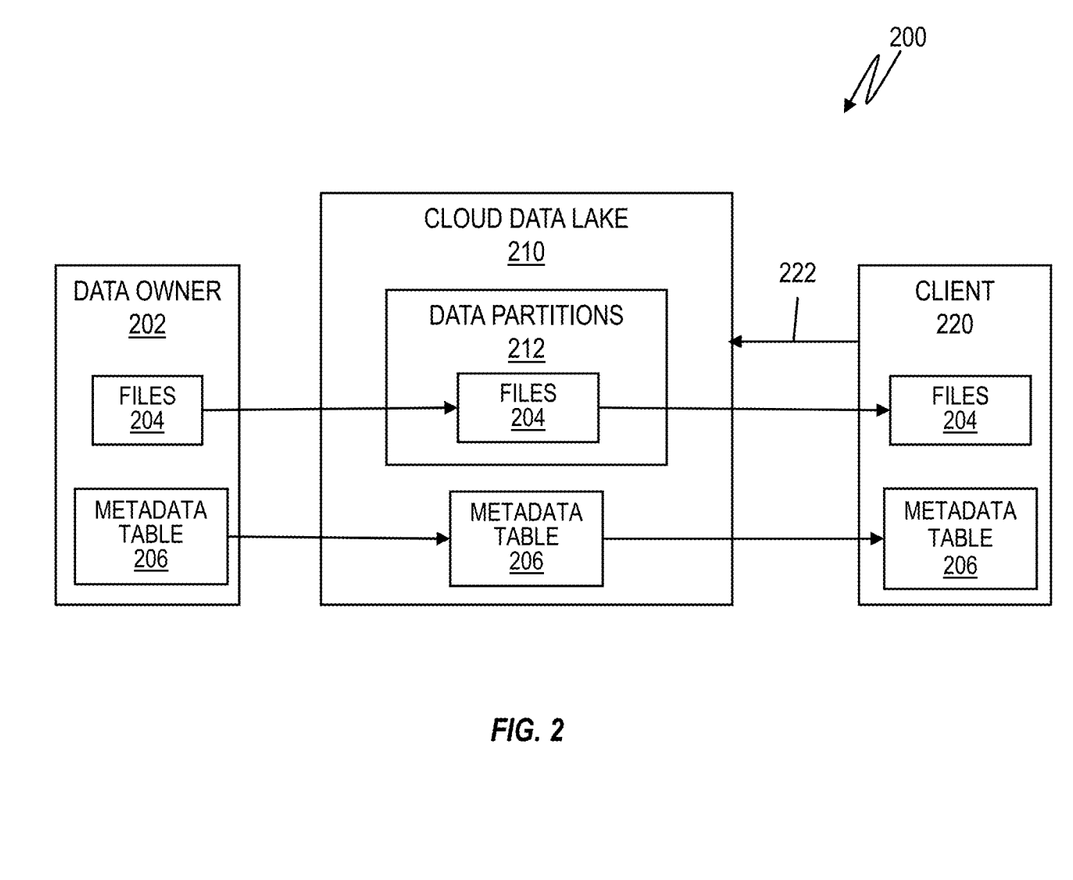
FIG. 2 depicts a block diagram of a system for storing and obtaining data from a cloud data lake in accordance with one or more embodiments of the present disclosure.

Referring now to FIG. 2, a block diagram of a system 200 for storing and obtaining data from a cloud data lake 210 in accordance with one or more embodiments of the present disclosure is shown. In exemplary embodiments, a data owner 202 uploads or stores one or more files 204, also referred to herein as objects, to data partitions 212 in a cloud data lake. In exemplary embodiments, the data partition 212 corresponding to a file 204 is encoded inside a file name, or object key, of the file 204. For example, an object or file that has three partitions, "department", "year", and "month", may have a file name, "datalake/department=sales/year=2023/month=03/sales_03_23.parquet." In exemplary embodiments, the partitioning scheme of the cloud data lake depends on the specific requirements and characteristics of the data, which may be specified by the data owner. Using logical partitions is a best practice for improving data retrieval performance and organization, where clients usually query based on logical partitions rather than individual objects. In addition, the data owner 202 creates and maintains a metadata table 206. In exemplary embodiments, the metadata table 206 includes a plurality of rows that each correspond to a different data partition 212. Each of the plurality of rows includes identifying information for the data partition 212 and a partition hash value that is determined based on the files stored in the data partition by the data owner. In one embodiment, the partition hash value is determined based on the file names or object keys of the files stored in the data partition by the data owner. In another embodiment, the partition hash value is determined based on the content of files stored in the data partition by the data owner.

In an exemplary embodiment, the cloud data lake 210 stores copies of the files 204 in the corresponding data partitions 212 and a copy of the metadata table 206. In an exemplary embodiment, the data owner 202 is configured to periodically update the metadata table 206 and to transmit the updated metadata table 206 to the cloud data lake 210. Although the metadata table 206 is illustrated as being stored in the cloud data lake 210, it may be stored in any number of different locations that are accessible to client 220. In exemplary embodiments, the data owner 202 electronically signs the metadata table 206 and the client 220 is configured to verify the signature of the data owner on the metadata table 206.

In exemplary embodiments, a client 220 is configured to obtain a plurality of files 204 from the cloud data lake 210 by transmitting a request 222 that includes a list of the desired partitions 214 to the cloud data lake 210. In some embodiments, the request may include a logical predicate (e.g., year>X AND department=Y OR department=Z). In response to request 222, the cloud data lake 210 transmits a list of each of the stored files 204 that correspond to the listed partitions 214 to the client 220. In one example, a client 220 transmits a LIST(Predicate) request to the cloud data lake 210, which returns a list of file names satisfying the predicate. The client 220 then performs a GET(filename) request for each returned file name to get the files' content.

Once the client 220 receives the plurality of file names, the client sorts the files by partition 212 and calculates a hash value for each partition. In one embodiment, the hash value is calculated for each partition based on the file names or object keys of the files corresponding to each partition. In another embodiment, the partition hash value is calculated for each partition based on the content of the files corresponding to each partition. If the calculated hash value and the partition hash value from the metadata table are the same, the data obtained for that partition is complete. However, if the calculated hash value and the partition hash value from the metadata table are not the same, the data obtained for that partition is not complete.

Figure 3:
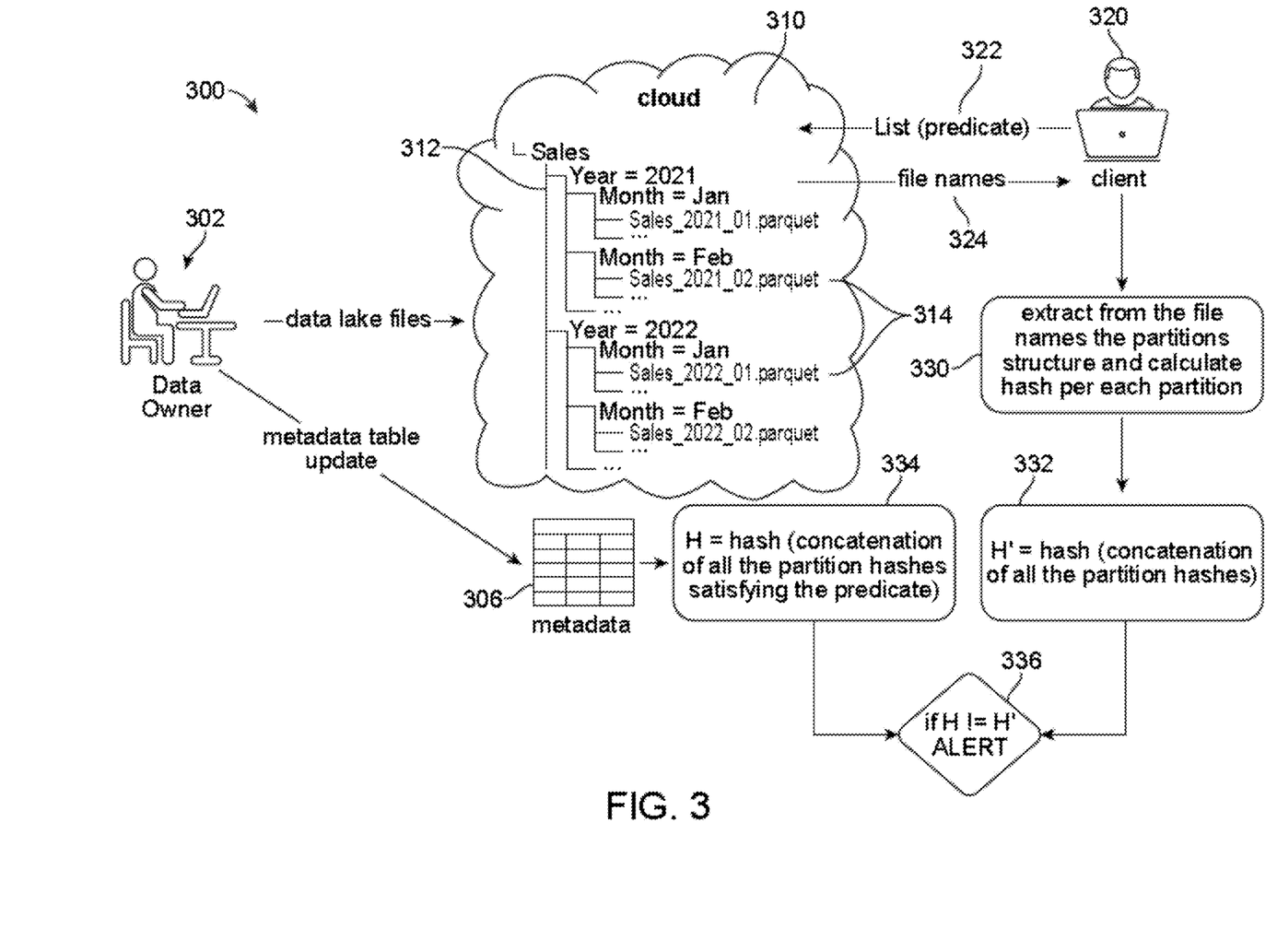
FIG. 3 depicts a schematic diagram of a system for providing integrity verification of data obtained from a cloud data lake in accordance with one or more embodiments of the present disclosure.

Referring now to FIG. 3, a schematic diagram of a system 300 for providing integrity verification of data obtained from a cloud data lake in accordance with one or more embodiments of the present disclosure is shown. As illustrated, the system 300 includes a data owner 302 that stores one or more objects or files 314 in a cloud data lake 310. The system 300 also includes one or more clients 320 that transmit a request 322 the cloud data lake 310, which in turn, provides a response 324 that includes one or more objects or file names 314 that were identified based on the request 322. In exemplary embodiments, the cloud data lake 310 includes a partition structure 312 that is utilized to store the objects or files. In exemplary embodiments, the file name 314 of each file includes an encoding of a partition of the partition structure 312 that is associated with the file.

In exemplary embodiments, the data owner 302 is configured to create and maintain a metadata table 306. The metadata table 306 includes a plurality of entries, each of which correspond to a partition 312 of the partition structure. In an exemplary embodiment, each entry in the metadata table 306 includes a hash value that corresponds to a partition. The hash value for an entry, or partition 312, is calculated based on the files that correspond to that partition 312. In one embodiment, the hash value is calculated based on the file names or object keys of the files corresponding to each partition. In another embodiment, the partition hash value is calculated for each partition based on the content of the files corresponding to each partition.

In exemplary embodiments, when the data owner needs to add or delete files to or from existing partitions, the data owner can do so by reading all the relevant file names from the cloud, verifying their completeness (similar to what the clients do), and recalculating the hash based on the added or deleted files. However, reading files from the cloud takes time and computational resources. One way to address this issue is to calculate the partition hash not as a concatenation of all the file names, but by applying the same hash function and concatenation multiple times recursively. For example, if a partition has 3 files (f1, f2, f3), the partition hash will be calculated as H(H(H(f1)||f2)||f3), where H( ) is a hash function and || denotes concatenation. By using this method, the data owner can add new files to the existing partitions without the need to read anything from the cloud. A similar technique can be applied when the data owner deletes files.

In exemplary embodiments, in response to the request 322, the cloud data lake 310 provides response 324 that includes a plurality of file names 314 to the client 320. After the client receives the response 324, the client 320 extracts a partition structure from the file names 314 or object names of the plurality of files and calculates a hash for each identified partition, as shown at block 330. Next, as shown at block 332, the client 320 creates a calculated concatenated hash value (H') by contacting each of the calculated values. At block 334, the client 320 creates a verified combined hash value (H) by concatenating the hash values for the identified partitions, where the hash values are obtained from the metadata table 306. At decision block 336, if the verified combined hash value (H) is not equal to the calculated concatenated hash value (H') an alert indicating that the response 324 is incomplete is created.

Figure 4:
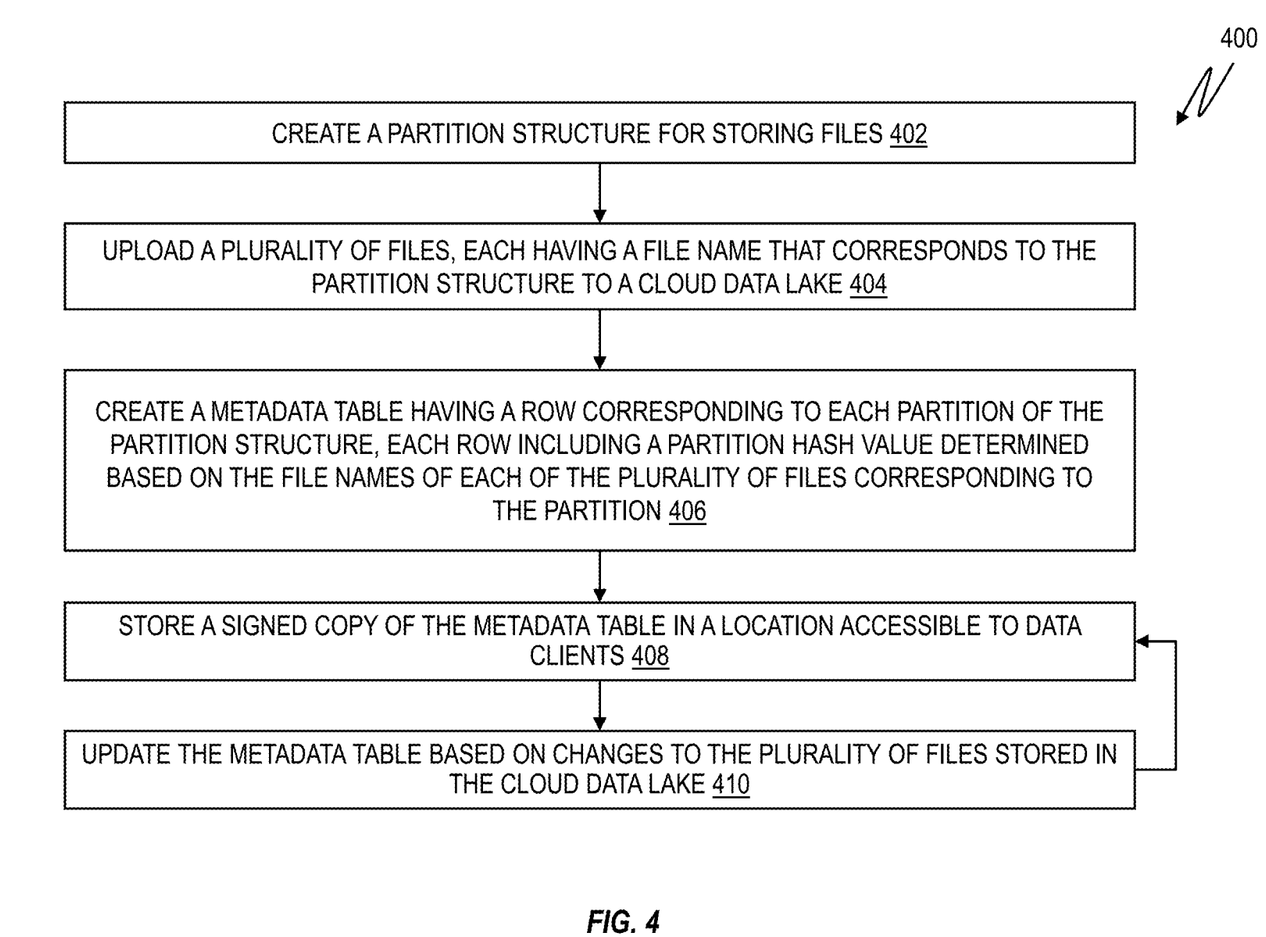
FIG. 4 depicts a flowchart of a method for storing objects in a cloud data lake in accordance with one or more embodiments of the present disclosure.

Referring now to FIG. 4, a flowchart of a method for storing objects in a cloud data lake in accordance with one or more embodiments of the present disclosure is shown. In exemplary embodiments, the method 400 is performed by a data owner 202, 302 of FIG. 2 or 3 utilizing a client computer 101, such as shown in FIG. 1. As shown at block 402, the method 400 includes creating a partition structure for storing files. In exemplar embodiments, the partition structure is a hierarchical structure that is utilized to organize files or objects stored in a cloud data lake. Next, as shown at block 404, the method 400 includes uploading a plurality of files, each having a file name that corresponds to the partition structure, to a cloud data lake. In exemplary embodiments, the file name of each of the plurality of files includes an encoding of a partition of the partition structure that the file is associated with.

At block 406, the method 400 includes creating a metadata table having a row corresponding to each partition of the partition structure, where each row includes a partition hash value determined based on the file names of each of the plurality of files corresponding to the partition. In one embodiment, each of the file names associated with a particular partition are ordered and concatenated and the partition hash value is created by hashing the ordered and concatenated collection of file names associated with each partition. Next, as shown at block 408, the method 400 includes storing a signed copy of the metadata table in a location accessible to data clients. In exemplary embodiments, the digital signature can contain a timestamp of the latest update so the clients can verify the use of an up-to-date version of the metadata table. In one embodiment, the metadata table is stored on the same cloud data lake as the plurality of files. The method 400 also includes updating the metadata table based on changes to the plurality of files stored in the cloud data lake.

Figure 5:
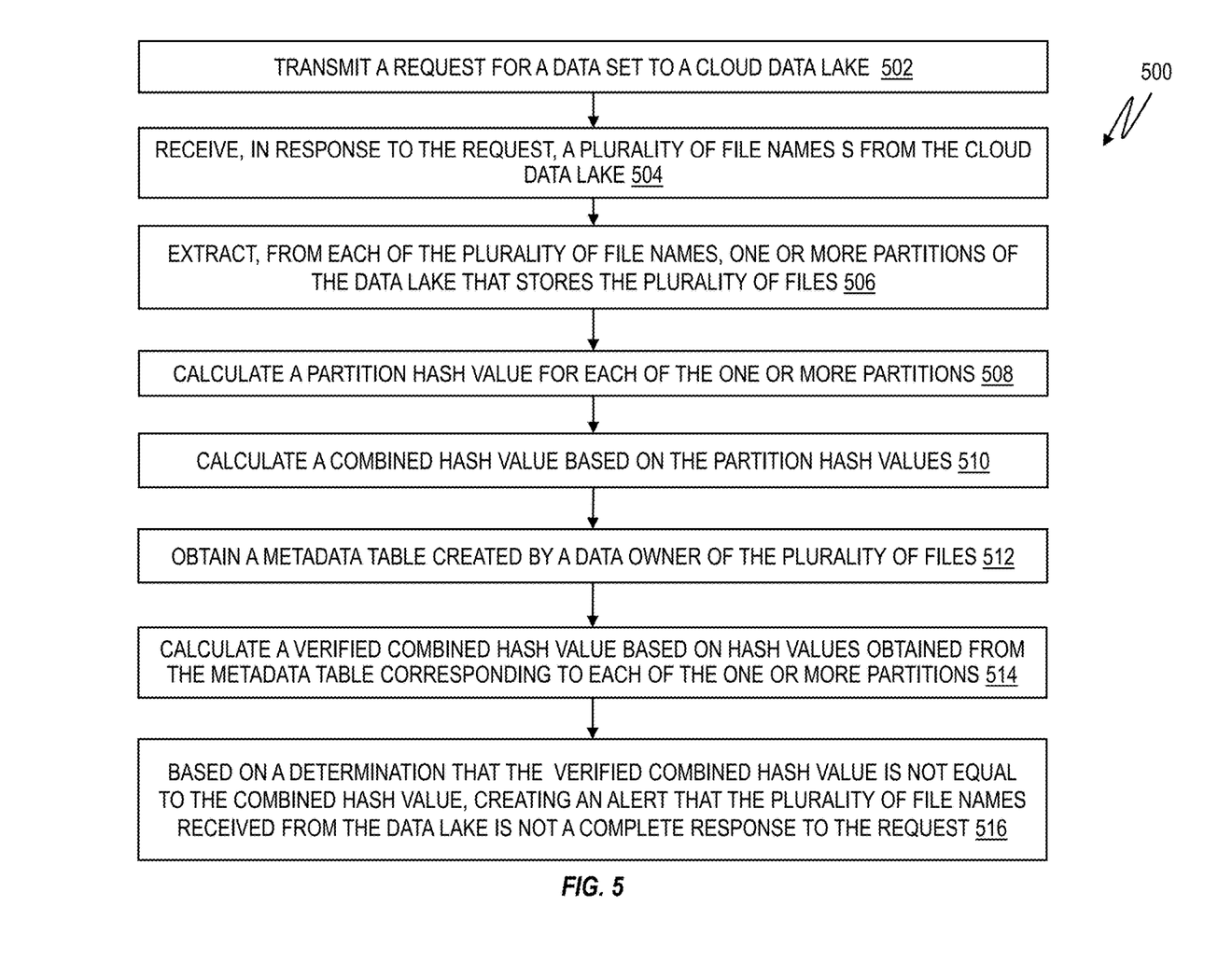
FIG. 5 depicts a flowchart of a method for performing integrity verification of data obtained from a cloud data lake in accordance with one or more embodiments of the present disclosure.

Referring now to FIG. 5, a flowchart of a method for performing integrity verification of data obtained from a cloud data lake in accordance with one or more embodiments of the present disclosure is shown. In exemplary embodiments, the method 500 is performed by a client 220, 320 of FIG. 2 or 3 utilizing a client computer 101, such as shown in FIG. 1.

As shown in block 502, the method 500 includes transmitting a request for a data set to a cloud data lake. In exemplary embodiments, the request includes a list of predicates that correspond to portions of the partition structure used to store files in the cloud data lake. In some embodiments, the request is a LIST(Predicate) request that includes a logical predicate. Next, as shown at block 504, the method 500 includes receiving, in response to the request, a plurality of file names from the cloud data lake.

The method 500 also includes extracting, from the file names, one or more partitions of the data lake that stores the plurality of files, as shown at block 506. Next, as shown at block 508, a partition hash value for each of the one or more identified partitions is calculated. In one embodiment, each of the file names associated with a particular partition are ordered and concatenated and the partition hash value is created by hashing the ordered and concatenated collection of file names associated with each partition. The method 500 also includes calculating a combined hash value based on the partition hash values, as shown at block 510. In one embodiment, the partition hash values of the identified portions are ordered and concatenated to create the combined hash value.

The method 500 also includes obtaining a metadata table created by a data owner of the plurality of files, as shown at block 512. In exemplary embodiments, the metadata table is verified based on verifying that a digital signature of the metadata table corresponds to the data owner. Next, as shown at block 514, the method 500 includes calculating a verified combined hash value based on hash values obtained from the metadata table corresponding to each of the one or more partitions. In exemplary embodiments, the one or more partitions from the metadata table are identified by applying the same predicate that client sent to the cloud to get the file names. In one embodiment, the verified combined hash value is calculated by ordering and concatenating the hash values obtained from the metadata table for each of the identified partitions. At block 516, the method 500 includes creating an alert that the plurality of file names received from the data lake is not a complete response to the request based on a determination that the verified combined hash value is not equal to the combined hash value. In exemplary embodiments, based on a determination that the verified combined hash value is equal to the combined hash value, the method 500 includes verifying that the plurality of file names received from the cloud data lake is a complete response to the request.

Figure 6:
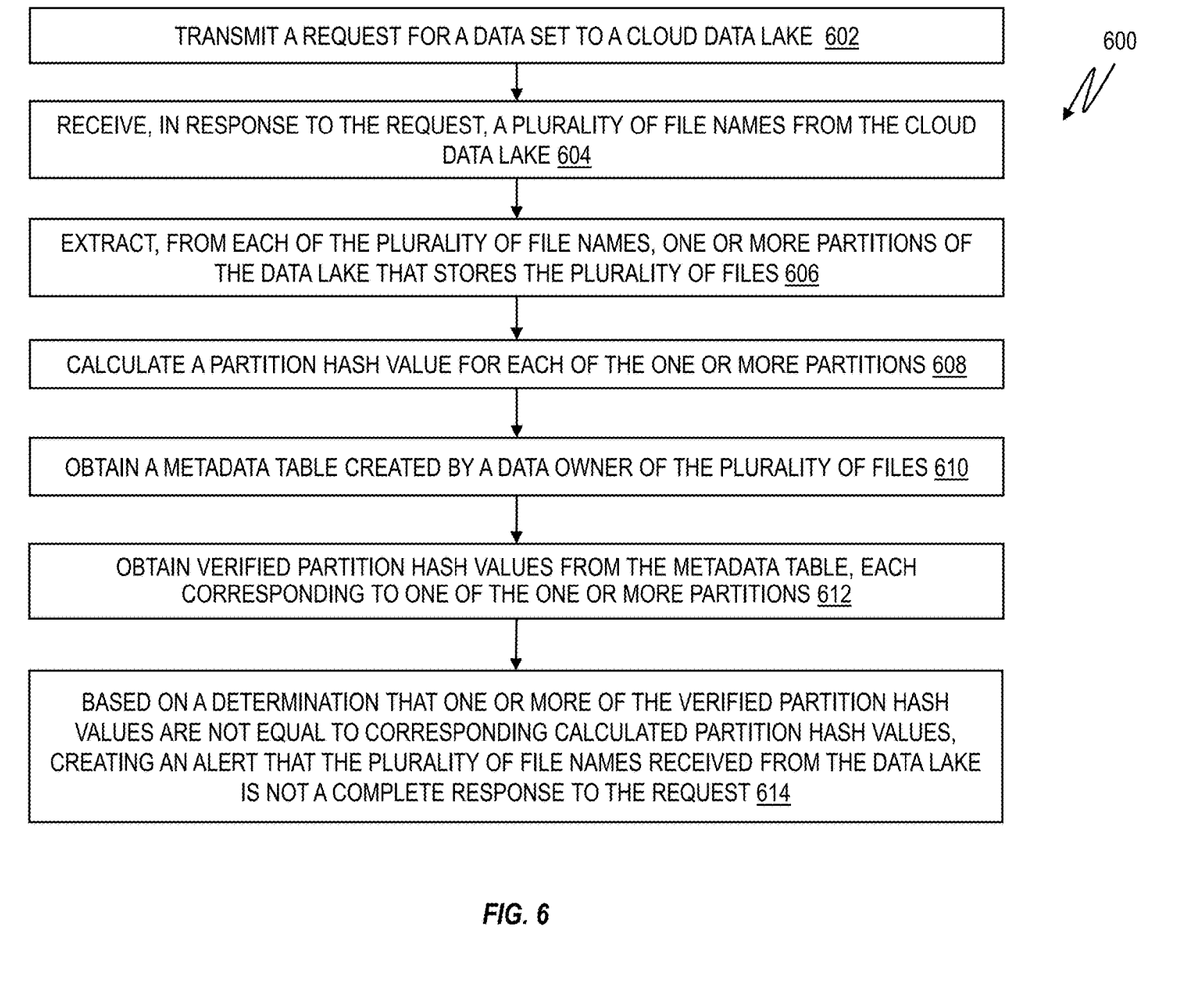
FIG. 6 depicts a flowchart of another method for performing integrity verification of data obtained from a cloud data lake environment in accordance with one or more embodiments of the present disclosure.

Referring now to FIG. 6, a flowchart of another method for performing integrity verification of data obtained from a cloud data lake environment in accordance with one or more embodiments of the present disclosure is shown. In exemplary embodiments, the method 600 is performed by a client 220, 320 of FIG. 2 or 3 utilizing a client computer 101, such as shown in FIG. 1.

As shown at block 602, the method 600 includes transmitting a request for a data set to a cloud data lake. In exemplary embodiments, the request includes a list of predicates that correspond to portions of the partition structure used to store files in the cloud data lake. Next, as shown at block 604, the method 600 includes receiving, in response to the request, a plurality of files from the cloud data lake. The method 600 also includes extracting, from a file name of each of the plurality of files, one or more partitions of the data lake that stores the plurality of files, as shown at block 606. Next, as shown at block 608, a partition hash value for each of the one or more identified partitions is calculated. In one embodiment, each of the file names associated with a particular partition are ordered and concatenated and the partition hash value is created by hashing the ordered and concatenated collection of file names associated with each partition.

The method 600 also includes obtaining a metadata table created by a data owner of the plurality of files, as shown at block 610. In exemplary embodiments, the metadata table is verified based on verifying that a digital signature of the metadata table corresponds to the data owner. Next, as shown at block 612, the method 600 includes obtaining verified partition hash values from the metadata table, each of the verified partition hash values corresponding to one of the one or more partitions. In exemplary embodiments, the one or more partitions from the metadata table are identified by applying the same predicate that client sent to the cloud to get the file names. The method 600 also includes creating an alert that the plurality of file names received from the data lake is not a complete response to the request based on a determination that one or more of the verified partition hash values are not equal to the corresponding calculated partition hash values. In exemplary embodiments, the alert includes an indication of the partitions for which the verified partition hash values are not equal to the corresponding calculated partition hash values. In exemplary embodiments, the method 600 also includes verifying that the plurality of file names received from the data lake is the complete response to the request based on a determination that all of the verified partition hash values are equal to corresponding calculated partition hash values.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing integrity verification of data obtained from a cloud data lake, the method comprising:
   transmitting a request for a data set to the cloud data lake;
   receiving, in response to the request, a plurality of file names from the cloud data lake;
   extracting, from the plurality of file names, one or more partitions of the cloud data lake that stores a plurality of files that satisfy the request;
   calculating a partition hash value for each of the one or more partitions;
   obtaining a metadata table created by a data owner of the plurality of files and verifying the metadata table based on a digital signature of the metadata table corresponding to the data owner;
   obtaining verified partition hash values from the metadata table, each corresponding to one of the one or more partitions;
   calculating a combined hash value based on the partition hash values and calculating a verified combined hash value based on hash values obtained from the metadata table corresponding to each of the one or more partitions;
   based on a determination that one or more of the verified partition hash values are not equal to corresponding calculated partition hash values, creating an alert that the plurality of files received from the cloud data lake is not a complete response to the request; and
   in response to determining that one or more of the verified partition hash values are not equal to corresponding calculated partition hash values, identifying and reporting the specific partitions for which the mismatch occurs in the alert,
   wherein the metadata table is stored in a location that is external to the cloud data lake and is accessible to the client performing the integrity verification.

2. The computer-implemented method of claim 1, wherein the partition hash value for each of the one or more partitions is calculated based on a hash of each of the plurality of file names corresponding to the one or more partitions.

3. The computer-implemented method of claim 1, wherein the partition hash value for each of the one or more partitions is calculated based on a hash of a content of each of a plurality of files corresponding to the one or more partitions.

4. The computer-implemented method of claim 1, further comprising creating the alert that the plurality of file names received from the cloud data lake is not a complete response to the request, based on a determination that the verified combined hash value is not equal to the combined hash value.

5. The computer-implemented method of claim 1, further comprising verifying that the plurality of file names received from the cloud data lake is the complete response to the request based on a determination that the verified combined hash value is equal to the combined hash value.

6. The computer-implemented method of claim 1, wherein the alert includes an indication of a partition of the one or more partitions that has a calculated partition hash value that does not equal a corresponding verified partition hash value.

7. The computer-implemented method of claim 1, further comprising verifying that the plurality of file names received from the cloud data lake is the complete response to the request based on a determination that all of the verified partition hash values are equal to corresponding calculated partition hash values.

8. The computer-implemented method of claim 1, wherein verifying the metadata table based on the digital signature comprises using a public key associated with the data owner to authenticate the metadata table before using any hash values contained therein.

9. A computing system having a memory having computer readable instructions and one or more processors for executing the computer readable instructions, the computer readable instructions controlling the one or more processors to perform operations comprising:
   transmitting a request for a data set to a cloud data lake;
   receiving, in response to the request, a plurality of file names from the cloud data lake;
   extracting, from the plurality of file names, one or more partitions of the cloud data lake that stores a plurality of files that satisfy the request;
   calculating a partition hash value for each of the one or more partitions;
   obtaining a metadata table created by a data owner of the plurality of files and verifying the metadata table based on a digital signature of the metadata table corresponding to the data owner;
   obtaining verified partition hash values from the metadata table, each corresponding to one of the one or more partitions;
   calculating a combined hash value based on the partition hash values and calculating a verified combined hash value based on hash values obtained from the metadata table corresponding to each of the one or more partitions;
   based on a determination that one or more of the verified partition hash values are not equal to corresponding calculated partition hash values, creating an alert that the plurality of files received from the cloud data lake is not a complete response to the request; and
   in response to determining that one or more of the verified partition hash values are not equal to corresponding calculated partition hash values, identifying and reporting the specific partitions for which the mismatch occurs in the alert,
   wherein the metadata table is stored in a location that is external to the cloud data lake and is accessible to the client performing the integrity verification.

10. The computing system of claim 9, wherein the partition hash value for each of the one or more partitions is calculated based on a hash of each of the plurality of file names corresponding to the one or more partitions.

11. The computing system of claim 9, wherein the partition hash value for each of the one or more partitions is calculated based on a hash of a content of each of a plurality of files corresponding to the one or more partitions.

12. The computing system of claim 9, wherein the operations further comprise creating the alert that the plurality of file names received from the cloud data lake is not a complete response to the request, based on a determination that the verified combined hash value is not equal to the combined hash value.

13. The computing system of claim 9, wherein the operations further comprise verifying that the plurality of file names received from the cloud data lake is the complete response to the request based on a determination that the verified combined hash value is equal to the combined hash value.

14. The computing system of claim 9, wherein the alert includes an indication of a partition of the one or more partitions that has a calculated partition hash value that does not equal a corresponding verified partition hash value.

15. The computing system of claim 9, wherein the operations further comprise verifying that the plurality of file names received from the cloud data lake is the complete response to the request based on a determination that all of the verified partition hash values are equal to corresponding calculated partition hash values.

16. A computer program product comprising a computer readable storage medium having program instructions embodied therewith, the program instructions executable by a processor to cause the processor to perform operations comprising:
 transmitting a request for a data set to a cloud data lake;
 receiving, in response to the request, a plurality of file names from the cloud data lake;
 extracting, from the plurality of file names, one or more partitions of the cloud data lake that stores a plurality of files that satisfy the request;
 calculating a partition hash value for each of the one or more partitions;
 obtaining a metadata table created by a data owner of the plurality of files and verifying the metadata table based on a digital signature of the metadata table corresponding to the data owner;
 obtaining verified partition hash values from the metadata table, each corresponding to one of the one or more partitions;
 calculating a combined hash value based on the partition hash values and calculating a verified combined hash value based on hash values obtained from the metadata table corresponding to each of the one or more partitions;
 based on a determination that one or more of the verified partition hash values are not equal to corresponding calculated partition hash values, creating an alert that the plurality of files received from the cloud data lake is not a complete response to the request;
 in response to determining that one or more of the verified partition hash values are not equal to corresponding calculated partition hash values, identifying and reporting the specific partitions for which the mismatch occurs in the alert,
 wherein the metadata table is stored in a location that is external to the cloud data lake and is accessible to the client performing the integrity verification.

17. The computer program product of claim 16, wherein the partition hash value for each of the one or more partitions is calculated based on a hash of each of the plurality of file names corresponding to the one or more partitions.

18. The computer program product of claim 16, wherein the partition hash value for each of the one or more partitions is calculated based on a hash of a content of each of a plurality of files corresponding to the one or more partitions.

* * * * *